United States Patent [19]

Lyding et al.

[11] Patent Number: 5,464,876
[45] Date of Patent: Nov. 7, 1995

[54] PROCESS FOR THE RECOVERY OF VALUABLE MATERIALS DURING THE WORK-UP OF POLYVINYL CHLORIDE

[75] Inventors: Günther Lyding; Maria Pille, both of Kelkheim; Helmold von Plessen, Königstein; Joachim Semel, Eppstein, all of Germany

[73] Assignee: Hoechst Aktiengesellschaft, Germany

[21] Appl. No.: 317,765

[22] Filed: Oct. 4, 1994

[30] Foreign Application Priority Data

Oct. 7, 1993 [DE] Germany .................. 43 34 114.4

[51] Int. Cl.$^6$ .................................................. C10B 53/00
[52] U.S. Cl. .................. 521/46.5; 560/78; 201/3; 201/4; 201/17; 201/21; 201/22; 201/25; 201/28; 201/29; 201/30; 201/36
[58] Field of Search ............... 560/78; 521/46.5; 201/3, 4, 17, 21, 22, 25, 28, 29, 30, 36

[56] References Cited

U.S. PATENT DOCUMENTS

| | | | |
|---|---|---|---|
| 3,716,339 | 2/1973 | Shigaki et al. | 23/262 |
| 3,829,558 | 8/1974 | Banks et al. | 423/481 |
| 4,515,659 | 5/1985 | Wingfield et al. | 201/2.5 |
| 4,746,406 | 5/1988 | Timmann | 201/25 |
| 5,292,429 | 3/1994 | DesOrmeaux | 208/356 |

FOREIGN PATENT DOCUMENTS

| | | |
|---|---|---|
| 0226895 | 7/1987 | European Pat. Off. . |
| 510800 | 10/1992 | European Pat. Off. . |
| 4038896 | 11/1992 | Germany . |
| WO91/18960 | 12/1991 | WIPO . |

OTHER PUBLICATIONS

Database WPI Week 7423, Derwent Publications Ltd., London, GB; An 74–42243V & JP-A-48 067 190 (Chiba Inst Technology) Sep. 13, 1973.
Database WPI Week 7742, Derwent Publications, Ltd., London, GB; An 77–74665Y & JP-A-50 123 190 (Fujikura Cable Works).

*Primary Examiner*—Frederick Krass
*Attorney, Agent, or Firm*—Connolly & Hutz

[57] ABSTRACT

Heating of polyvinyl chloride, in particular plasticizer-containing polyvinyl chloride, to a temperature of from 250° to 500° C. in the absence of oxygen gives a low-chlorine, carbon-containing residue, plasticizer and hydrogen chloride.

2 Claims, 2 Drawing Sheets

PROCESS FOR THE RECOVERY OF VALUABLE MATERIALS DURING THE WORK-UP OF POLYVINYL CHLORIDE

The invention relates to a process for the work-up of polyvinyl chloride in which plasticizers and other valuable materials are recovered.

The disposal of plastic waste to landfill is becoming increasingly difficult; attempts must be made to utilize the material produced. One possibility in this respect is incineration with recovery of thermal energy. Low-emission power stations which are suitable for this are expensive. In addition, the toxic offgas components formed on incineration are increasingly regarded as pollution. The plastic polyvinyl chloride (PVC) is regarded particularly critically in this respect.

This situation provided the impetus for searching for processes for the mechanical recycling of PVC waste. PVC waste can be converted into new PVC parts. However, the processing methods available and the quality of the products which can be produced from the waste depend on whether the waste is clean or soiled, comprises a single type of material or a mixture, or comprises one or more components. In order to avoid existing problems, it is attempted to recover the chlorine content of the PVC waste in the form of hydrochloric acid or, after neutralization, as salt solution. Apart from at high cleavage temperatures, these products are always produced in highly contaminated form, so that they require expensive purification.

In order to avoid such needs, it has been proposed to react the PVC waste, if desired after pretreatment (sorting, cleaning, comminution), with metals or metal compounds (cf. DE 4 038 896). The hydrocarbons from the PVC serve as reducing agents and can replace the carbon which is otherwise usually added, while the chlorine content reacts like the chlorine otherwise added in the form of other chlorine-containing substances or like gaseous chlorine.

The process has the disadvantage of the different rates of the individual reactions, so that the process must be carried out in individual steps in separate reaction spaces.

Another process proposes mixing polyolefins and halogen-containing polyolefins and reacting the mixture at about 200° C. with from 5 to 15% of calcium compounds or salts of long-chain fatty acids (cf. EP 510 800). It is intended that the polymer mixture is subsequently converted into plastic articles by conventional methods. Apart from the fact that metal compounds remaining in the plastics can adversely affect the properties of the latter, this process also has the problem of compatibility of different plastic types with one another.

It has now been found that recycling of valuable materials from PVC waste is possible with the aid of a thermal process.

The invention thus relates to a process for the recovery of valuable materials during the work-up of polyvinyl chloride by thermal treatment of the polyvinyl chloride, which comprises heating the polyvinyl chloride to a temperature of from 250° to 500° C. in the absence of oxygen, producing hydrogen chloride, a carbon-containing residue and a plasticizer-containing distillate, and recovering the plasticizer from the distillate by fractional distillation.

In the novel process, PVC, in particular flexible PVC, is subjected to thermolysis in a reactor at a temperature from 250° to 500° C., preferably from 300° to 400° C., giving, in addition to hydrogen chloride and a carbon-containing residue, a plasticizer-containing distillate, which can be burned or worked-up further.

The carbon-containing residue generally contains <0.5% of chlorine and can be worked up without difficulties or used as a fuel for the novel process or for chemical processes of other types.

BRIEF DESCRIPTION OF THE DRAWINGS

The figures show the novel process.

In FIG. 1:
1=reactor
2=burner
3=hot-gas line
4=feed line
5=discharge line
6=discharge line
7=condenser
8=condenser outlet line
9=condensate pump
10=line
11=line
12=heat exchanger
13=line
14=offgas line
15=branch line
16=branch line
17=circulating-gas line
18=circulating-gas compressor
19=branch line In FIG. 2:
21=rotating flask (= reactor)
22=heating mantle
23=rotary drive
24=condenser
25=feed line
26=outlet
27=safety receiver
28=transfer line
29=collecting flask
30=condenser
31=outlet line
32=shut-off valve
33=feed line
34=gas-washing bottle
35=gas-washing bottle
36=offgas line The novel process is carried out in an apparatus shown diagrammatically in FIG. 1.

Figure 1:
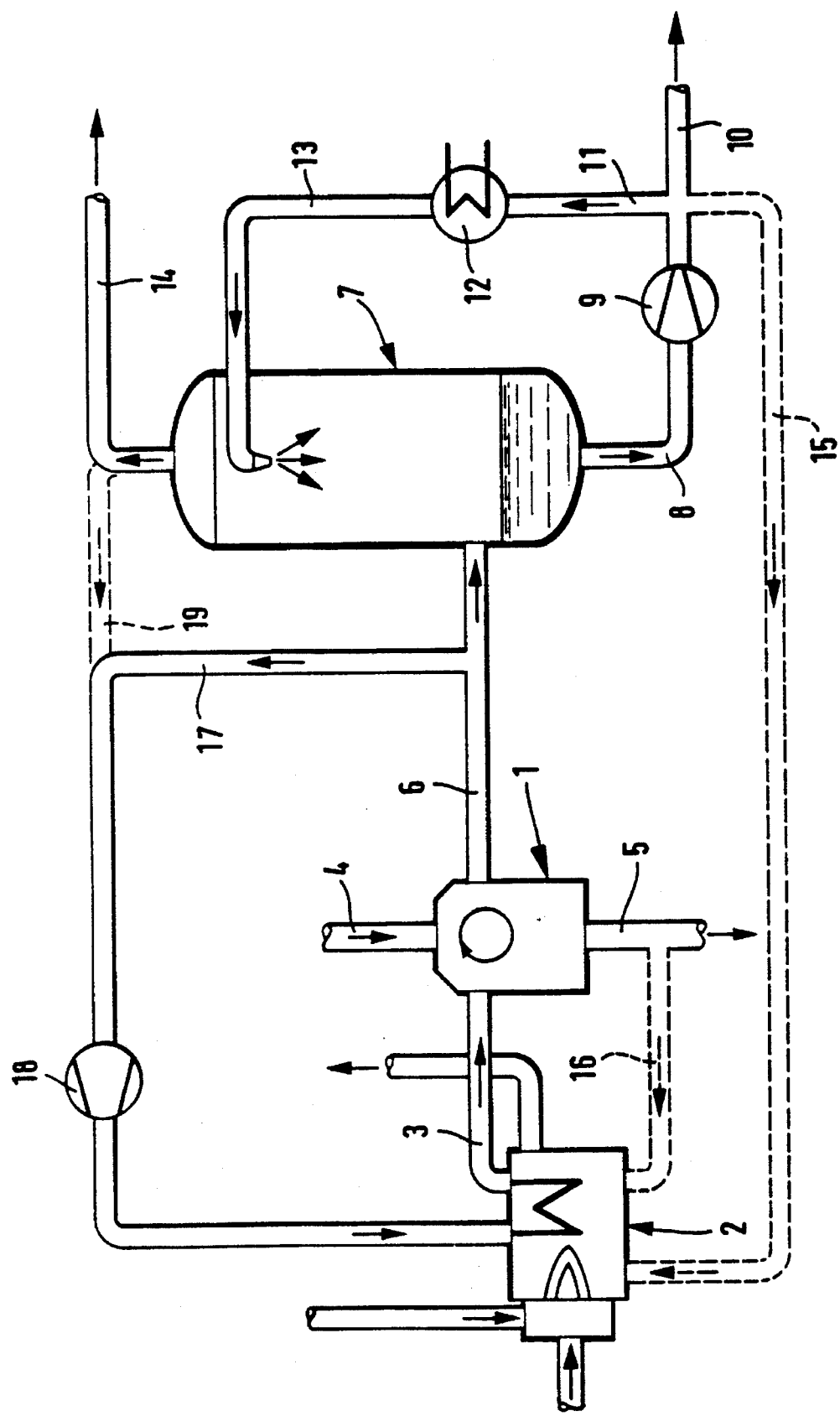
FIG. 1 gives a schematic view of a large-scale industrial plant.

A reactor (1) is connected to a burner (2) via a hot-gas line (3). The reactor (1) is furthermore provided with a feed line (4) and discharge lines (5) and (6), the discharge line (6) forming a connection to the condenser (7). A condensate outlet line (8) runs from the base of the condenser (7) via a condensate pump (9) into line (10), from which a line (11) branches off and is connected via a heat exchanger (12) to a line (13), which itself runs to the top of the condenser (7). The condenser (7) also carries an offgas line (14) at the top. If necessary, a branch line (15) can run back from line (10) to the burner (2). A branch line (16) can likewise run from the discharge line (5) to the burner (2). Finally, the discharge line (6) is connected to the burner (2) via a circulating-gas line (17) and via a circulating-gas compressor (18). Alternatively a part of the gas stream (14) can be returned to the process via gas line (19) and circulating-gas compressor (18).

Figure 2:
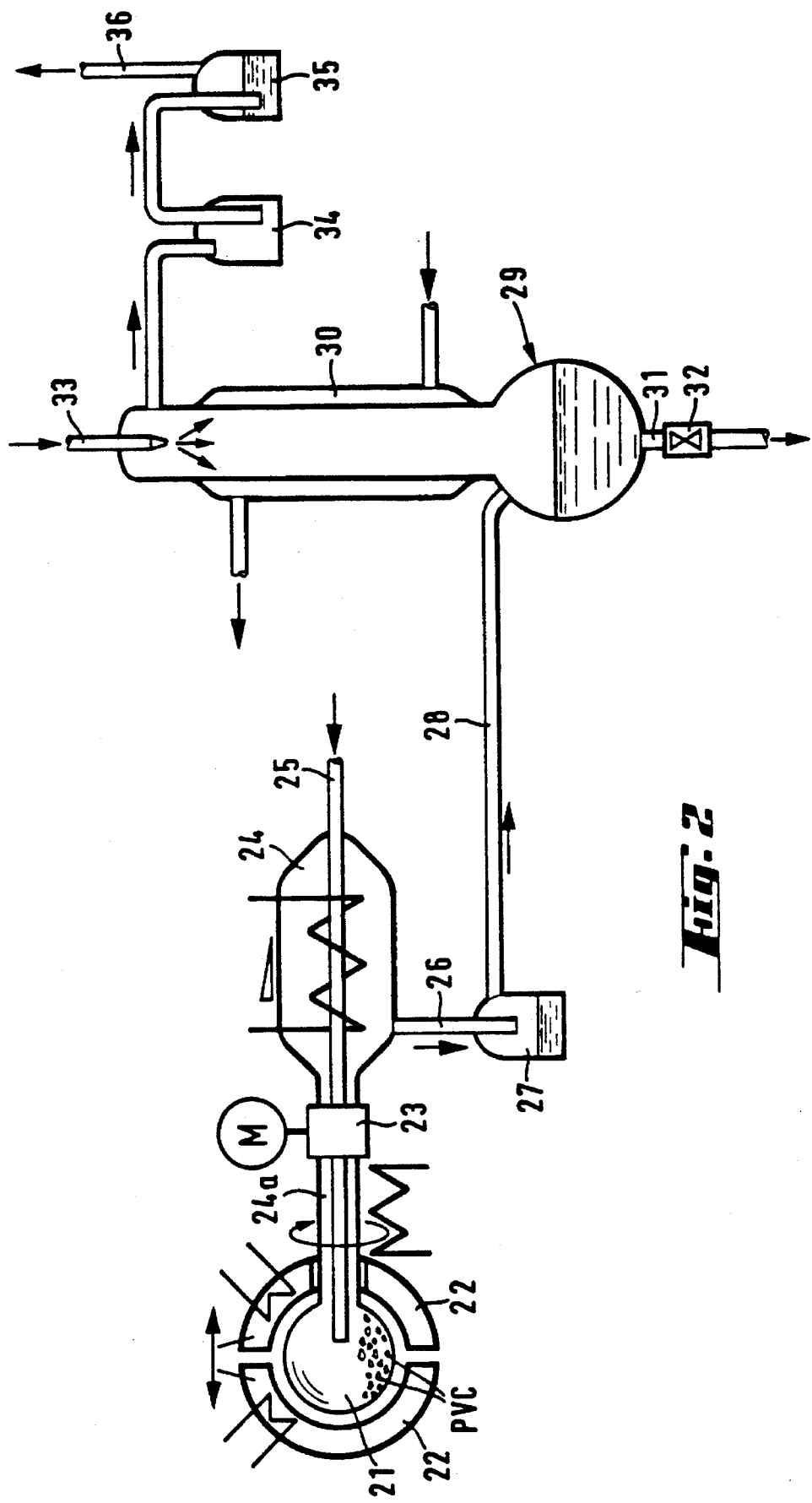
FIG. 2 illustrates a laboratory apparatus.

The laboratory apparatus as shown in FIG. 2 essentially comprises a rotary evaporator which is connected to a condenser and a receiver. The rotating flask (21) is the reactor, which is surrounded by two heating mantles (22). The flask (21) is rotated by the rotary drive (23), which surrounds the connecting tube (24a). The rotary evaporator has a condenser (24), through which a feed line (25) runs into the flask (21). The outlet (26) of the condenser (24) is connected to a receiver (27), which is itself connected to the collecting flask (29) by means of a transfer line (28). The collecting flask (29) has at the bottom an outlet line (31) with a shut-off valve (32). On top of the collecting flask (29) is a condenser (30) with a feed line (33) at the upper end. The condenser (30) is furthermore connected at the upper end to an offgas line (36) via two gas-washing bottles (34) and (35).

In the industrial-scale version of the novel process, as shown in FIG. 1, PVC waste, if desired after pretreatment by sorting, cleaning and comminution, is fed to the reactor (1) which is heated to a temperature of 250° to 500° C., preferably from 300° to 400° C., by means of the recycled thermolysis gases from the process. After passing through the reactor (1) in the absence of oxygen, a dark-colored residue remains from the plastic material and is removed through the discharge line (5) and, after cooling and any washing or other aftertreatment, can be ground or prepared for further use. After leaving the reactor (1), some of the reaction gas is fed back into the process through the circulating-gas line (17), the circulating-gas compressor (18), the burner (2) and the hot-gas line (3). In the burner (2), the reaction gas is heated by heat exchange with the hot flue gases produced in the burner. The remainder of the reaction gas is fed to the condenser (7) via the discharge line (6). Liquid distillate can be withdrawn continuously from the condensation device loop formed by the condensate pump (9) and the condenser (7). Hydrogen chloride, uncondensable hydrocarbons and inert gases escape at the top of the condenser via the offgas line (14).

The carbon-containing residue present in the reactor (1) can, after cooling and, if necessary, washing or other aftertreatment, be employed as a fuel, for example in the novel process via branch line (16), or for another use. Likewise, some of the gas mixture escaping at the top of the condenser (7) can, after heating, be fed back into the process (via branch line (19)).

The thermolysis of the PVC waste can be carried out using various reactor types, such as rotary kilns, multiple-hearth furnaces or fluidized-bed furnaces. Rotary kilns are particularly advantageous for carrying out the novel process.

The gaseous products can be fed to an adsorption apparatus, and the hydrochloric acid obtained can then be utilized in a known manner in an oxychlorination process or for other chemical reactions.

The distillate obtained in the condensation device can either be worked-up in a further step of the novel process or used as a fuel for firing the burner (2).

Suitable separation techniques for working up the distillate are proposed, such as distillation, extraction, crystallization, membrane processes or others, but preferably distillation. Since the boiling points of conventional plasticizers for PVC are >200° C., the distillation must be carried out under greatly reduced pressure and advantageously in a short-path evaporator. In order to remove the various constituents of the plasticizer-containing distillate from the novel process, the work-up is carried out in the form of a fractional distillation. The most important plasticizer for PVC is currently bis(2-ethylhexyl) phthalate (DOP).

The novel process is particularly suitable for the work-up of all types of flexible PVC.

The examples below are intended to illustrate the invention.

EXAMPLES 1 TO 7

A rotary evaporator was provided, as shown in FIG. 2, with a 500 cm$^3$ round-bottomed flask (21) and with an axial feed line (25) for nitrogen or water (for the formation of steam) which extended into the centre of the flask (21). The flask (21) could be jacketed with two fitting heating mantles (22) (maximum output 200 W each) in such a way that the rotary movement (40 min$^{-1}$) was not hindered. The connecting pipe (24a) between the flask (21) and the rotary drive (23) of the rotary evaporator was kept warm by means of a hot-air fan.

It was found to be advantageous to operate the heating mantles (22) at full heating power, but to arrange them, on steel rods installed on both sides, in such a way that they could gradually be moved away from one another. In this way, the desired temperatures could readily be set in the reaction flask (21) (350° or 400° C.). The apparatus had to be slightly inclined in order to be able to collect the distilling plasticizer directly behind the connecting pipe (24a) in the receiver (27). Other products collected in the collecting flask. The eliminated hydrogen chloride was absorbed by water in a downstream device comprising the gas-washing bottles (34) and (35).

At the beginning of each of the experiments, 31 g of flexible PVC powder (27.7% of DOP) were introduced into the flask and a gentle stream of nitrogen (steam in Example 7) was established. When the heating was complete, the two heating mantles were moved far apart from one another, and the flask was cooled rapidly by a stream of cold air. The dehydrochlorinated PVC was freed from adhering impurities by boiling with water, filtering and washing with water. Tables 1 and 2 show the results.

At a temperature of from 350° to 400° C. and a residence time in the range from 15 to 30 minutes, flexible PVC gave yields of 25% of dehydrochlorinated PVC, 25% of plasticizer distillate and 30–35% of hydrogen chloride, as well as uncondensable hydrocarbons.

The plasticizer component obtained on thermolysis contained 3.3% of organically bound chlorine and <0.3% of chloride. Analysis by gas chromatography and mass spectrometry showed that the brown oil comprised mostly di(2-ethylhexyl) phthalate (DOP). In addition, significant amounts of chlorooctanes were present.

For work-up, the brown oil was subjected to fractional distillation at 1 to 5 mbar. The distillation apparatus comprised boiling flask, distillation bridge, distillate divider, receiving flask, cold trap and vacuum pump.

The results of the distillation are shown in Table 3. The yield was 96.8%.

While Fraction 1 as the main constituent contained diverse chlorooctanes and Fraction 2 contained predominantly DOP, Fractions 3 and 4 comprised substantially DOP.

TABLE 1

Thermolysis with rotation, experimental conditions

| | Apparatus | | | | | |
|---|---|---|---|---|---|---|
| Experiment | Arrangement of the heating mantles | Temperature control | Heating duration min | Residence time at reaction temperature min | Reaction temperature °C. | Flushing gas |
| 1 | fixed | controlled | 30 | 15 | 342–355 | Nitrogen |
| 2 | fixed | controlled | 48 | 15 | 4344–361 | Nitrogen |
| 3 | fixed | controlled | 72 | 15 | 343–356 | Nitrogen |
| 4 | moveable | full heating power | 8 | 15 | 335–357 | Nitrogen |
| 5 | moveable | full heating power | 8 | 30 | 345–355 | Nitrogen |
| 6 | moveable | full heating power | 7 | 15 | 395–410 | Nitrogen |
| 7 | moveable | full heating power | 6 | 15 | 342–355 | Steam |

TABLE 2

Thermolysis with rotation, experimental results

| | Yields in % of starting material | | | Dehydrochlorinated PVC Analyses | |
|---|---|---|---|---|---|
| Experiment | Dehydrochlorinated PVC | Distillate | Absorbed hydrogen chloride | crude % of chlorine | washed with water % of chlorine |
| 1 | 14 | 32 | not determined | 0.40 | 0.06 |
| 2 | 28 | 20 | 34 | 0.35 | 0.31 |
| 3 | 29 | 20 | 50 | 0.42 | 0.33 |
| 4 | 33 | 12 | 34 | 0.49 | 0.42 |
| 5 | 32 | 26 | 45 | 0.56 | 0.42 |
| 6 | 24 | 31 | 24 | 0.29 | 0.21 |
| 7 | 32 | 30 | 10 | 0.95 | 1.3 |

TABLE 3

Fractional distillation of the plasticizer component

| Fraction | Boiling point °C. | Amount in % of starting material | Composition |
|---|---|---|---|
| 1 | 35–100 | 7.0 | about 40% of chlorooctane, about 10% of DOP |
| 2 | 100–175 | 9.6 | about 60% of DOP, about 15% of ethyl hexanol |
| 3 | 175–196 | 42.9 | about 90% of DOP |
| 4 | 193–214 | 20.4 | about 90% of DOP |
| Bottom product | >214 | 6.1 | |
| Residue in the apparatus | | 5.6 | |
| Residue in the cold trap | | 5.2 | |

We claim:

1. Process for the recovery of reusable materials during the work-up of polyvinyl chloride by thermal treatment of the polyvinyl chloride, which comprises heating the polyvinyl chloride to a temperature of from 250° to 500° C. in the absence of oxygen, producing hydrogen chloride, a carbon-containing residue and a plasticizer-containing distillate, and recovering the plasticizer from the distillate by fractional distillation, wherein said plasticizer is a carboxylic acid ester.

2. The process as claimed in claim 1, wherein the thermal treatment of the polyvinyl chloride is carried out in a rotary kiln, multiple-hearth furnace or fluidized-bed furnace.

* * * * *